March 24, 1953    C. A. BROCK ET AL    2,632,526
MUFFLER AND FILTER
Filed April 1, 1948

INVENTORS.
Clarence A. Brock
Thomas Richard Hunter
BY
Harness, Dickey & Pierce
ATTORNEYS.

Patented Mar. 24, 1953

2,632,526

UNITED STATES PATENT OFFICE 2,632,526

MUFFLER AND FILTER

Clarence A. Brock and Thomas Richard Hunter, Toledo, Ohio, assignors to Martin Parry Corporation, Toledo, Ohio, a corporation of Delaware Application April 1, 1948, Serial No. 18,348

3 Claims. (Cl. 183—71)

This invention relates to cleaning or filtering means generally and more particularly to a readily replaceable filter means adapted for removing dirt and dust from fluids such as air, for example, contaminated therewith.

Air filtering means of this general character, heretofore utilized, while being readily replaceable, possessed the one great disadvantage that after use, no matter how much care was exercised in removing the used filter for replacement purposes, some or a good deal of the dirt precipitant adhering to the sides of the filter would become dislodged and fall into the working part or parts of a device such as a suction cleaner, for example, with which it had been operatively assembled. By virtue of the present invention novel filter means have been provided with the use of which any dirt precipitant which becomes dislodged from the filter during replacement, or at any other time, falls into a receptacle or trap formed as a part of the filter so that the foregoing disadvantage surrounding known filter elements has been overcome.

An object of the present invention therefore is to provide a novel and improved filter expedient for contaminated fluids such as air, for example.

Another object of the invention is to provide a novel and replaceable filter for fluids having means formed as a part thereof which will intercept any dirt precipitant normally clinging to the filter which may become dislodged therefrom during removal of the filter for replacement purposes or at any other time.

A further object is to provide a novel air filter of the character described adapted to function in the desired manner whether air flowing therethrough be from the inside of the filter to the outside thereof, or whether such air flow is reversed, namely, from the outside of the filter to the inside thereof.

Another object is to provide a novel air filter having a maximum filtering or cleaning surface area arranged in a minimum amount of space, the cleaning element thereof being provided as a hollow annulus having a predetermined width and formed with a series of accordion pleats or folds, the peripheries of the folds being alternately arranged at the outside and inside diameter of the annulus.

The above and further objects and advantages of the invention will appear more fully hereinafter from a consideration of the detailed description which follows, taken together with the accompanying drawing, wherein two embodiments of the invention are illustrated. It is to be expressly understood, however, that the drawing is for the purpose of illustration only and is not to be construed as defining the limits of the invention.

In the drawings wherein like reference characters refer to like parts throughout the different views.

Figure 1:
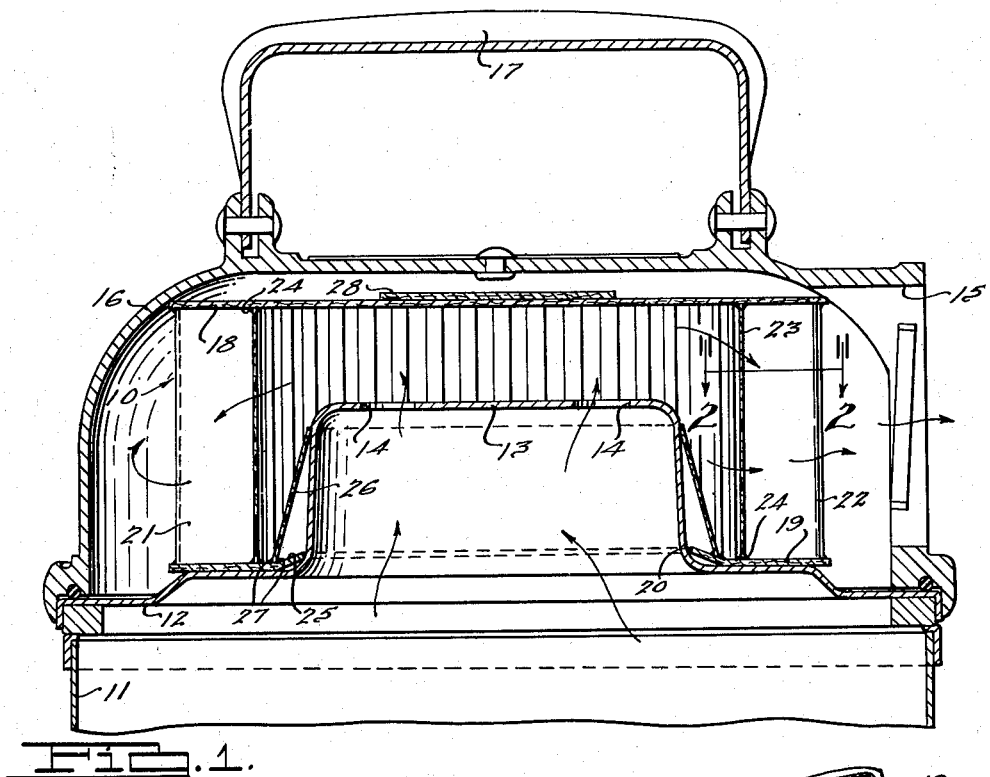
Figure 1 is a side elevation view in section of one embodiment of the novel fluid filter of the present invention illustrating a useful application thereof.

Referring now to the drawings for a more detailed description of the present invention and more particularly to Figure 1 thereof, the novel fluid or air filter hereof, generally designated with the reference character 10, is shown in one of its many applications, namely, as being applied at the outlet end of a suction cleaner of the character described and claimed in my United States Patent No. 2,228,750 issued January 14, 1941. As more fully described in the aforementioned patent, such a cleaner generally includes an intermediate body portion 11 and a cover portion 12 sealably engaged therewith and having a central stamping therein forming a cup-shaped member 13 which is provided at its inner end with a series of apertures 14 permitting communication of the interior of body portion 11 with the exterior of the cleaner through an outlet 15 formed in an external cover 16 having a lifting bail 17 suitably fastened thereto.

While a liquid chamber is interposed between the cleaning nozzle and the motor or pump chamber to clean the incoming air from the dirt and dust contained therein which enters the nozzle some of the dirt may pass with the air through the outlet 15. Since it is undesirable that such contaminated air be discharged from outlet 15 to the room or enclosure being cleaned, the novel air filter hereof is provided between the cleaner and its outlet to assure nothing but clean air from passing out of the outlet.

The novel air filter 10 of the present invention comprises two spaced annular plates 18 and 19, the upper plate 18 being solid and formed of some strong and substantially non-porous material, such as cardboard or a series of laminated sheets of paper bonded to each other by way of a suitable adhesive, and the lower plate 19 being formed of the same material but having a central opening 20 therein by virtue of which the filter element may be nested with cup 13 and may rest by way of its lower plate 19 on the upper surface of cover 12. By virtue of this arrangement air flowing from body portion 11, as designated by the arrows in Figure 1, must pass through filter 10 by way of apertures 14 formed in cup 13 before it can pass to outlet 15.

Figure 2:
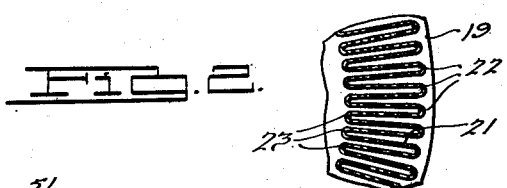
Figure 2 is a fragmentary sectional view of the filter taken substantially along line 2—2 of Figure 1.

Interposed between the outer portion of plates 18 and 19, is a filter element 21 formed of suitable filtering paper which is porous enough to permit clean air to flow therethrough but which, however, is fine enough to prevent passage therethrough of dust and dirt particles suspended in the contaminated air which it is desired to clean. Filter element 21 comprises a sheet of filter paper which is formed with a series of folds in the manner of accordion folds and thereafter formed into a hollow cylinder having a wall of a predetermined thickness, the outer periphery of which is determined by the locus of the peaks of the outer folds 22 (Figure 2) and the inner periphery of which is determined by the peaks of the alternate inner folds 23. The inner surfaces of the plates 18 and 19 are provided with a suitable adhesive 24 whereby filter element 21 may be assembled between and secured to both plates.

The inner periphery of lower plate 19 is made to extend inwardly beyond the inner periphery of filter element 21, which is defined by the peaks of its inner folds 23, and its innermost end is dished upwardly as at 25 so as to conform to the configuration of the surface on which it will normally rest, such surfaces in the example shown in Figure 1, being the top portion of cover 12 where it joins the side walls of cup 13. Interposed between the dished portion 25 of lower plate 19 and the peaks of the inner folds 23 of filter element 21, and in spaced relation with the latter, is a substantially rigid cone 26 formed of suitable material such as the stiff paper utilized for the upper and lower plates. The bottom of cone 26 is suitably secured to the upper portion of plate 19 by way of adhesive material 27. By the provision of the cone 26, a novel trap or chamber is defined by reason of which any dust or dirt which has been deposited on the inner wall of the filter element 21 during a filtering operation and which may have been dislodged therefrom upon removal of the filter, for replacement purposes, will fall into such chamber and will be retained therein thereby preventing the dirt from inadvertently falling through apertures 14, for example, back into body portion 11.

It will now be readily apparent that by providing the novel filter 10 hereof between the outlet of a device such as a suction cleaner and the inlet thereof, as shown in Figure 1, dust and dirt laden air will pass through apertures 14 of cup 13 and will impinge tangentially on the various inner surfaces of the walls defined by filter element 21, in such a manner that the foreign matter in the air will cling to or be deposited on the walls of the filtering element permitting clean air only to pass through the walls to outlet 15. In the event that some of the dirt particles are dislodged from the walls, they will fall into and collect within the trap or chamber defined by the inner periphery of filtering element 21 at the inner surface of cone 26 so that the undesirable foreign matter will at all times be within the filter and upon removal of the filter for replacement purposes the dirt will be localized and will be therefore readily disposable with the used filter.

While filter 10 has been described in connection with its filtering and cleaning properties only, it will be apparent that by providing the filter above the motor and pump, normally mounted within body portion 11, it will also act as a muffler to minimize the amount of noise generated by the working parts of the cleaner. In order that filter 10 may be strengthened where necessary, a reinforcing rib or annular disk 28 may be secured to the top of upper plate 18 as shown in Figure 1.

The novel filter of the present invention has been illustrated in Figure 1 in one of its many applications where contaminated air passes into the interior of the filter permitting passage of clean air from the outside thereof. However, the novel filter of the present invention is equally adapted for reverse flow of the air to be cleaned, namely, the contaminated air may flow from the outside of the filter to pass clean air to the interior thereof. The latter application for reverse air flow is clearly shown in Figure 3 of the drawing wherein a filter element 50, similar in all respects to filtering element 21 of Figure 1, is suitably fastened between upper and lower plates 51 and 52. The outer ends of the plates extend considerably beyond the outer periphery of filtering element 50 and have interposed therebetween an annular wall 53, the inner portion of which together with the outer periphery of filtering element 50, defines a trap or chamber for collecting any and all dirt particles which during a filtering operation have been deposited on the outside walls of filtering element 50 and have subsequently become dislodged therefrom. In this last application, a cover plate 54 may be formed with a central cup shaped portion 55 having apertures 56 therein, the filter resting by virtue of the inner ends of its lower plate which is apertured for this purpose about cup 55. Upper plate 51 is provided at its outer periphery with a series of apertures 57 which communicate the interior of the chamber defined by the outer wall of filtering element 50 and the inner portion of wall 53 with the exterior of the filter.

Figure 3:
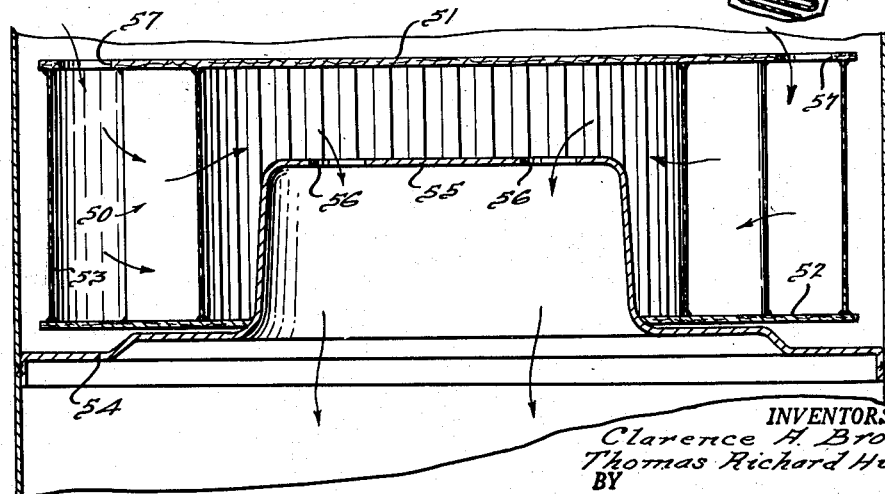
Figure 3 is a side elevation view in section of a second embodiment of the novel fluid filter hereof.

Contaminated air in this instance flows, as shown by the arrows in Figure 3, from the outside of the filter through apertures 57 to the outer wall of filter element 50 to impinge tangentially on the various walls of the filtering element, the filtering element being impervious to dirt and dust, obstructing passage of the latter so that it collects and is deposited upon the outside of the walls of the filtering element and clean air alone passes through the walls to the interior of the filter and out therefrom through apertures 56. It will be readily apparent that if the foreign matter deposited on the outside of the filtering element 50 falls or becomes dislodged therefrom, it will fall and be collected within the chamber defined by the inner periphery of wall 53 and the outer periphery of filtering element 50. Thus the dirt and the filter may be readily removed together for replacement purposes.

A stiffening plate or rib (not shown) may be secured to the upper part of plate 51 for reinforcing or stiffening the filter in the same manner that plate 28 of Figure 1 is utilized.

It will now be readily apparent to those skilled in the art that a new and novel filter has been provided by the present invention wherein any dirt or dust which has been dislodged from the walls of the filtering element will not fall into the device with which the filter is assembled but will instead fall into a suitable receptacle formed as a part of the filtering element.

Although the filter has been described in its application to a suction cleaner it is to be specifically understood that it is not limited to such use but may be used wherever it is desired to segregate foreign matter contained in any working fluid such as air, for example.

Although but two embodiments of the invention have been illustrated and described, various changes and modifications in the form and relative arrangement of the parts, which will now appear to those skilled in the art, may be made without departing from the spirit and scope of the invention. For example, instead of providing the aperture 20 in lower plate 19 alone, a second aperture in alignment with the first aperture may be provided in top plate 18 whereby the filter may be sleeved about a motor or pump housing having side perforations through which air may be exhausted directly into the interior of the filter.

What is claimed is:

1. A gas filter comprising an annular filter of plaited filter paper and having a vertical axis, the inner periphery of said filter comprising an inlet and the outer periphery of said filter comprising an outlet whereby gas flows radially from the inside to the outside of the filter, axially and vertically spaced cardboard plates glued to opposite ends of said filter and disposed radially and horizontally with respect to said vertical axis, the lower of said plates having a central inlet opening for admitting gas to said inner periphery but of substantially less diameter than said inner periphery, and an annular cardboard wall with a vertical axis and of substantially less diameter than said inner periphery and substantially less length than said filter glued at its lower end to said lower plate around said opening to form with said lower plate a trap for solid particles separated from the gas at said inlet periphery.

2. The invention as set forth in claim 1 wherein said annular wall is frusto-conical and its end of larger diameter is glued to said lower plate intermediate said opening and inner periphery and its other end of smaller diameter has a diameter which is substantially the same as said opening whereby the edges of said opening and smaller end are adapted to receive a cylindrical inlet conduit having a vertical axis.

3. The invention as set forth in claim 2 wherein an annular portion of said lower plate immediately surrounding said opening is formed on an angle with respect to the rest of the plate and extends axially toward the other plate.

CLARENCE A. BROCK.
THOMAS RICHARD HUNTER.

REFERENCES CITED

The following references are of record in the file of this patent:

UNITED STATES PATENTS

| Number | Name | Date |
|---|---|---|
| 1,572,888 | Danhardt | Feb. 16, 1926 |
| 2,122,111 | Poelman et al. | June 28, 1938 |
| 2,183,737 | Bilde | Dec. 19, 1939 |
| 2,463,722 | Spraragen | Mar. 8, 1949 |

FOREIGN PATENTS

| Number | Country | Date |
|---|---|---|
| 440,585 | Great Britain | Jan. 2, 1936 |
| 489,109 | Great Britain | July 19, 1938 |
| 802,295 | France | June 6, 1936 |